United States Patent [19]

Krepski et al.

[11] Patent Number: 5,951,749
[45] Date of Patent: Sep. 14, 1999

[54] WATER-BASED PIGMENTED INKS

[75] Inventors: Larry R. Krepski, White Bear Lake; Prabhakara S. Rao, Maplewood; Terrance P. Smith, Woodbury; Kenneth D. Wilson, Stillwater; Richard J. Kuo, Saint Paul, all of Minn.

[73] Assignee: 3M Innovative Properties Company, St. Paul, Minn.

[21] Appl. No.: 09/180,704

[22] PCT Filed: May 16, 1996

[86] PCT No.: PCT/US96/07078

§ 371 Date: Nov. 13, 1998

§ 102(e) Date: Nov. 13, 1998

[87] PCT Pub. No.: WO97/43351

PCT Pub. Date: Nov. 20, 1997

[51] Int. Cl.⁶ .................................... C09D 11/02
[52] U.S. Cl. ................... 106/31.75; 106/31.78; 106/31.86
[58] Field of Search ............ 106/31.75, 31.78, 106/31.86

[56] References Cited

U.S. PATENT DOCUMENTS

| 4,485,236 | 11/1984 | Rasmussen et al. | 544/69 |
| 4,597,794 | 7/1986 | Ohta et al. | 106/31.6 |
| 4,639,286 | 1/1987 | Rasmussen et al. | 544/69 |
| 4,705,889 | 11/1987 | Hendricks et al. | 562/564 |
| 5,085,698 | 2/1992 | Ma et al. | 106/31.6 |
| 5,125,968 | 6/1992 | Takimoto et al. | 106/31.75 |
| 5,236,741 | 8/1993 | Zwiener et al. | 427/385.5 |
| 5,243,012 | 9/1993 | Wicks et al. | 528/58 |
| 5,284,512 | 2/1994 | Koskan et al. | 106/416 |
| 5,725,647 | 3/1998 | Carlson et al. | 106/31.86 |
| 5,840,106 | 11/1998 | Krepski et al. | 106/31.75 |
| 5,854,308 | 12/1998 | Kuo et al. | 523/161 |

FOREIGN PATENT DOCUMENTS

| 0 105 665 B1 | 4/1984 | European Pat. Off. | C07D 263/42 |
| 0 195 328 B1 | 9/1986 | European Pat. Off. | C07C 101/26 |

OTHER PUBLICATIONS

Patent Abstracts of Japan–JP 5140059, Jun. 1993.

*Primary Examiner*—Helene Klemanski
*Attorney, Agent, or Firm*—Gary L. Griswold; John H. Hornickel

[57] ABSTRACT

Water-based pigmented inks are disclosed. Such inks are formed from water-based dispersions of pigment particles having novel dispersants therein. The dispersions are formed from the reaction product of an amino acid compound with a nitrogen reactive compound with subsequent hydrolysis providing the capability of the dispersant to hydrophobically interact with the pigment particles. The resulting inks are well-suited for use in ink jet and other printing applications.

22 Claims, No Drawings

WATER-BASED PIGMENTED INKS

FIELD OF THE INVENTION

The present invention relates to water-based pigmented inks, and in particular, such inks adapted for use with ink jet printing applications.

BACKGROUND OF THE INVENTION

In recent years, the use of thermal ink jet printers in numerous applications has increased dramatically. Such printers make use of liquid-based inks which are sprayed onto a receptor, typically a sheet of paper or film, to produce an image. By using four basic ink colors (black, yellow, cyan, and magenta) in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with ink jet and other printers are primarily comprised of dyes contained within organic- or water-based carrier liquids. Although such inks may offer satisfactory performance in certain applications, the present trend is away from such systems, since such systems tend to produce images that lack the light stability and durability required for outdoor and similarly demanding applications. Additionally, the use of organic-based carrier liquids creates numerous environmental and material-handling complications. Rather, the printing industry has sought inks which are primarily water-based, to thereby reduce or eliminate the problems associated with organic solvent-based systems.

Initial attempts to form water-based pigmented inks for ink jet applications were less than successful. In one approach, such inks comprised a suspension of pigment particles in a water-based carrier. Unfortunately, the suspended pigments tended to agglomerate. Since ink jet printers make use of very small jet nozzles (on the order of less than about 80 micrometers) to provide high resolution images, the resulting pigment agglomerations had a tendency to restrict or clog the printer heads. This effect is referred to herein as "plugging". Additionally, in the case of thermal ink jet systems, such inks also suffered from the tendency of materials to settle onto, and coat, the heating elements of the printer heads. This causes a decreased thermal efficiency of the print head which results in the formation of smaller ink droplets and lower image quality. This effect is commonly referred to as "kogation".

To overcome the problems described above, some water-based ink jet inks have employed dispersants. In one approach, the dispersants were formed from surfactants which contain a hydrophilic portion as well as a hydrophobic portion. In another approach, copolymers having hydrophilic segments and hydrophobic segments were used. Examples of these approaches are described in the art, for example in U.S. Pat. No. 4,597,794 and U.S. Pat. No. 5,085,698.

In the approaches described above, the hydrophobic segments of the surfactant or polymer can absorb onto pigments by "hydrophobic" interaction between the dispersant molecule and the organic-based pigments whose surfaces tend to be hydrophobic. This hydrophobic interaction is usually not very strong. As a result, in thermal ink jet systems, there is a possibility that the dispersant molecules can desorb from the pigment surface, thereby allowing the pigment particles to flocculate. During printing, this can result in plugging of the printer head jet nozzles.

Other attempts involving the use of polymeric dispersants have been attempted as well. For example, water-soluble polymers and particulate polymer dispersions have also been considered, yet these have yielded only partial success. In particular, such systems, although promising, have tended to produce non-uniform printed solid block images. The lack of uniformity in the printed image, which becomes more pronounced with prolonged printing, is caused by incomplete coverage of the receptor surface in the image area. This problem, commonly referred to as "banding" results from progressively smaller projected ink drops over the course of a printing job. This effect is believed to be a result of kogation, caused by deposition of thermal insulating materials on the heating elements within the printing cartridge. As a result, heat transfer efficiency into the ink is reduced, thereby reducing the ability to produce properly sized ink bubbles needed for the printing process. Even if the deposited material is thermally conductive, it may still change the nucleation behavior on the heater surface during heating which also may adversely affect the bubble formation.

In addition, there is some reason to believe that the presence of any residual polymeric material which is not adsorbed on a pigment particle may have a propensity to deposit onto the heater elements when they are intensely heated during the jetting process. It may also be possible that the polymeric dispersant molecules which are adsorbed on pigment particles may increase the adhesion of pigment particles to the heater elements at elevated temperatures. The detrimental effects of deposition of foreign substances on the heater elements, either polymeric dispersant or pigment particles, are kogation and the jetting problems described above.

SUMMARY OF THE INVENTION

In view of the foregoing, a need exists for water-based inks for ink jet applications which reduce the agglomeration or flocculation of pigment particles, and which reduce the deposition of foreign substances on heater elements during the jetting process. A need also exists for inks which offer stability in both short- and long-term regimes.

The present invention addresses such needs in that it relates to water-based pigmented inks that meet the stringent requirements of ink jet and other printing applications. More particularly, the present invention relates to stable, water-based pigmented inks in which an inventive dispersant is incorporated into a water-based pigment dispersion in order to eliminate or reduce the likelihood that the pigment particles will agglomerate. Such inks comprise, generally, an aqueous suspension of a) pigment particles, and b) a dispersant based on N-substituted amino acids.

More particularly, the inks of the present invention can include a dispersant which is formed from a compound which may be described broadly as the reaction product of N-substituted amino acids. More specifically, the reaction product is a compound formed from one or more equivalents of N-substituted aspartic acid joined at their nitrogen ends by a carbon chain of 2–20 carbons. For example, in one embodiment, two equivalents of a dialkyl maleate are allowed to react with a diamino alkane to produce a product such as "polyaspartic ester Desmophen™ XP-7059" (available from Bayer Corporation, Pittsburgh, Pa., hereafter "Bayer"). The reaction product is then reacted with a compound that can react with or add to the nitrogen atom(s) of the amino acid. Nonlimiting examples of these "nitrogen reactive compounds" include acylating reagents (such as acid halides or acid anhydrides); carbamoyl halides; sulfamoyl halides; alkylating reagents (such as alkyl halides, alkyl mesylates, alkyl tosylates, alkyl sulfates, and epoxides); isocyanates; isothiocyanates; and sulfonating reagents (such as alkyl sulfonyl halides or aryl sulfonyl halides).

Each of the nitrogen reactive compounds generally disclosed above has a region of hydrophobicity that permits hydrophobic interaction of the dispersant with hydrophobic pigmented particles. In general, the hydrophobic interaction achievable by the dispersant with pigmented particles depends on the number of groups, such as methylene groups or aromatic groups, available on the dispersant that can spread on the surface of each pigmented particle through hydrophobic interaction. Therefore, the number of carbon atoms on any of the nitrogen reactive compounds, i.e., the number of methylene groups or aromatic rings, can be controlled based on several considerations, such as the solubility of the dispersant in the water-based carrier liquid, the size of the pigmented particle to be dispersed in the water-based pigmented inks, and the relative amount of the hydrophilic portion and the hydrophobic portion in the dispersant molecule.

The hydrophobic portion serves to link with the pigment and the hydrophilic portion serves to disperse and to stabilize the pigment in the aqueous medium. The hydrophilic portion faces outward toward the aqueous medium and is partially solvated and ionized in alkaline aqueous media. So the outside of the pigment particle is covered by hydrophilic groups which give rise to a mutual repulsion between pigment particles so that dispersion stability can be maintained for a long time.

Ideally, the amount of the hydrophobic portion should be kept at a level just enough to provide sufficient interaction with hydrophobic pigment particles to survive thermal collision without desorption so that maximum amount of the hydrophilic portion is maintained to provide suitable protection for the particle during processing to minimize re-agglomeration.

In addition, unnecessarily large amount of the hydrophobic portion will result in decreased solubility of dispersant in the aqueous medium. This may have a detrimental effect in the case of water-based pigmented thermal inkjet inks because any residual insoluble dispersant molecules that are not adsorbed on a pigment particle may enhance the propensity to deposit onto the heater elements during the jetting process to make it impossible to achieve stable ejection over a long period of time.

The product of the present invention has applicability as a pigment dispersant in ink jet, and other printing inks. Furthermore, the product need not be limited to dispersant applications. Rather, it also may be used as a stabilizer or as a surfactant in such inks.

The reaction used to form the dispersants employed in the inks of the present invention is provided below in the section entitled "Dispersant".

Additionally, since the dispersant has a hydrophilic portion which contains at least one anionic carboxylic functional group per molecule, the dispersed pigment particles become effectively highly negatively charged. This is believed to prevent particle flocculation due to exceedingly strong repulsive forces between the dispersed particles. As discussed above, reduction of particle flocculation is desired because of the high thermal energy generated during jetting, which causes frequent and energetic particle interactions. Reduction of particle flocculation is further desired because it results in inks having increased dispersion stability and shelf-life.

The inks of the present invention may be used with numerous pigments. In particular, the inventive inks may be provided with black, cyan, yellow, and magenta pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the four colors discussed above. Rather, inks employing any pigment or combination of pigments that is compatible with electronic graphic image systems may be used herein.

Thus, the invention provides a water-based pigmented ink which comprises a suspension of pigment particles and a dispersant of a formula of

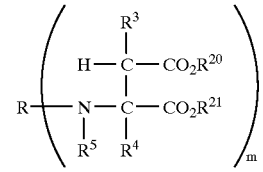

wherein R is an alkyl, aryl, or aralkyl group obtained by the removal of primary amino groups from alkyl, aryl, or aralkyl amines;

m=1 to 6;

$R^3$ and $R^4$ are hydrogen or lower alkyl;

$R^5$ is the residue of the nitrogen reactive compound selected from the group consisting of acylating reagents, carbamoyl halides, sulfamoyl halides, alkylating reagents, alkylating (epoxide) reagents, iso(thio)cyanates, sulfonating reagents, and azlactone reagents;

wherein $R^{20}$ and $R^{21}$ are independently, alkyl, aryl, or aralkyl groups, or a cation selected from the group consisting of a proton, lithium, sodium, potassium, ammonium, or tetraalkyl ammonium.

The invention also provides the dispersant described above prior to mixing with the pigment particles, a method of making such suspension of pigment particles and the dispersant, and a method of using the ink on a substrate.

Further aspects of the invention will become apparent with reference to the following embodiments.

EMBODIMENTS OF THE INVENTION

Pigment Selection: One important consideration in formulating a set of colored inks for printing color images is the compatibility of the inks with one another. This is important since the inks will be mixed together, or at the very least, contacted with one another, during the printing process when secondary colors are to be generated. When incompatible inks are mixed together, they can coalesce and present a mottled, non-uniform surface, particularly in solid fill areas. This greatly reduces the quality of the resulting printed image. As such, when used in a multi-color printing process (such as a four-color process) it is desirable to formulate each of the various colored inks using compatible, or preferably identical, formulations. Of course, in each of the formulations, the pigment will differ. Unfortunately, however, since the different pigments tend to have different surface properties, it is often very difficult to form inks in which stable pigment suspension liquids can be formulated using the same dispersant. That notwithstanding, the dispersants described herein have been found to be compatible with at least one pigment in each of the four primary printing colors.

For black inks, carbon black can be used as the black pigment. The selection of carbon blacks suitable for use with the present invention is based primarily upon considerations of surface oxidation (high "volatiles" preferred), and the degree of blackness (also called jetness) of the pigment. Pigments that are acidic or surface-treated provide suitable interaction sites for strong dispersant adsorption. Pigments having a high surface oxide content are more hydrophilic, and thereby much easier to disperse. Pigments with a high degree of blackness or jetness provide a high quality printed image.

For yellow inks, the use of nickel azo yellow pigment offers several advantages. First, such pigments provide inks which are highly durable in outdoor environments. Second, such pigments contain nickel ions which may be able to form complex bonds with the novel dispersants. Lastly, such pigments are believed to offer a high degree of thermal conductivity. As a result, if particle deposition onto a heater element does occur during the jetting process, the deposited film will not significantly reduce the heating efficiency of the ink, thereby allowing proper bubble formation.

For magenta inks, a primary consideration is lightfastness, since it is very desirable to produce graphic images that are adapted to outdoor applications. Quinacridone magenta pigment is known to have excellent lightfastness, and therefore, is one preferred magenta pigment.

For cyan inks, the considerations above, (i.e., lightfastness, durability, etc.), apply as well. As a variety of satisfactory properties may be found using copper phthalocyanine as a cyan pigment, inks comprising such pigments are one preferred embodiment.

Dispersant: The dispersants of the invention are particularly useful in stabilizing dispersions of hydrophobic materials (e.g., organic pigments and the like) in liquid dispersions and suspensions, especially aqueous dispersions and suspensions. The dispersants of the present invention may be the reaction products of amino acid compounds and nitrogen reactive compounds identified above. The substituents of the nitrogen reactive compounds for reaction with the amino acid compounds can be selected to tailor the physical properties of the resulting dispersant to the needs of particular combinations of surfaces and/or compounds which are to be stabilized within the dispersion.

The dispersants of the invention are prepared by reacting amino acid compounds with a nitrogen reactive compound identified above. In the reaction of the amino acid compounds with the nitrogen reactive compounds, it is usually necessary for both solubility reasons and to avoid the formation of side products to utilize the esters of the amino acid compounds. Examples of amino acid compounds include, but are not limited to glycine, alanine, valine, leucine, glutamic acid, lysine, methionine, proline, 2-aminoadipic acid, and phenylalanine.

It is also possible to utilize mono-N-substituted amino acid compounds to prepare the dispersants of the invention. Examples of amino-acid compounds include, but are not limited to N-substituted amino acid esters of the following N-substituted amino acids: N-methylglycine, N-butyl-2-(3,5,7-trimethyl-1-adamantyl)glycine, N-phenylglycine, N-(2-cyanoethyl)glycine, N-methyl-(1)-alanine, N-methyl-(d)-alanine, N-methyl-(dl)-alanine, 2-(methylamino) isobutyric acid, N-methyl-(d)-aspartic acid, N-benzyl-(dl)-aspartic acid, sarcosine, iminodiacetic acid, ethylene-N,N'-diacetic acid, Imidazole-4,5-dicarboxylic acid, L-thiazolidine-4-carboxylic acid, 3,4-dehydro-(dl)-proline, Pyrrole-2-carboxylic acid, (dl)-proline, diglycine, N-methyl-(dl)-glutamic acid, N-methyl-(d)-phenylalanine, N-methyl-(l)-leucine, N-α-methyl-(l)-histidine, H-meval-OH, 2,2'-(ethylenediamino)-dibutyric acid, N-cyclohexyl-β-alanine, (±)-cis-2,3-piperidine dicarboxylic acid, cis-2,5- piperidine dicarboxylic acid, carboxyethyl-gamma-amino-butyric acid, ethylenediamine-N,N'-dipropionic acid, (±)-cis-2-piperazine carboxylic acid, L-trans-pyrollidine-2,4-dicarboxylic acid, 2,2'-iminobis(1-cyclopentanecarboxylic acid), cis-2-(ethylamino)-1-cyclohexanecarboxylic acid. To avoid side products which could result from the reaction of amino acids which contain alcohols or thiols, (e.g.,serine or cysteine), with the nitrogen reactive compounds described above, it is necessary to utilize appropriately protected derivatives of these amino acids in the reaction. Methods of protecting amino acids are well-known in the art and are used extensively in the preparation of peptides.

One preferred embodiment of the N-substituted amino acid compounds is the class of compounds commonly referred to as "aspartic esters". Aspartic esters are hereinafter defined as the reaction product of a primary amine with an optionally substituted maleic or fumaric ester as shown in the following scheme:

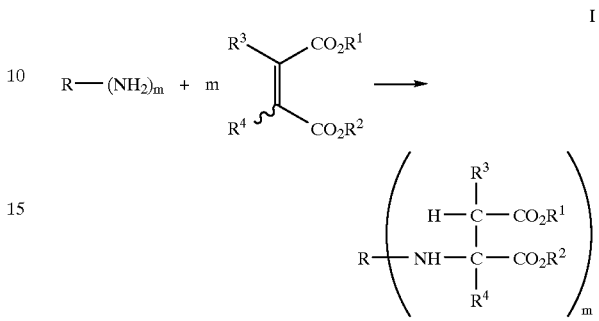

where R is an alkyl, aryl, or aralkyl group obtained by the removal of primary amino groups from alkyl, aryl, or aralkyl amines, m=1 to 6

$R^1$ and $R^2$ are alkyl, aryl, or aralkyl, and $R^3$ and $R^4$ are hydrogen or lower alkyl.

Examples of R include monovalent groups such as methyl, ethyl, butyl, octyl, hexadecyl, octadecyl, phenyl, and phenethyl which are obtained upon removal of the amino groups from the corresponding primary amines, divalent groups which are obtained after the removal of the primary amino groups from diamines such as 1,4-diaminobutane, 1,6-diaminohexane, 1,12-diaminododecane, 1,3-diaminopentane, 2-methyl-1,5-pentanediamine, 2,2,4- and 2,4,4-trimethyl-1,6-diaminohexane, 1-amino-3,3,5-trimethyl-5-aminomethylcyclohexane, 4,4'-diaminodicyclohexylmethane, and 3,3-dimethyl-4,4'-diaminodicyclohexyl methane. Other examples of R include the groups which are obtained after the removal of the primary amino groups from primary amines which contain secondary or tertiary amino groups such as N-ethylethylenediamine, N,N-dibutylethylenediamine, 3,3'-iminobispropylamine, triethylenetetramine, and spermidine. Other examples of R include the groups which are obtained after the removal of the primary amino groups from polyether amines such as 4,7,10-trioxa-1,13-tridecanediamine and amine terminated polyethers such as those marketed under the Jeffamine trademark by the Huntsman Corporation, Salt Lake City, Utah. An example of a trivalent R group is the group which is obtained after the removal of the primary amino groups from tris(2-aminoethyl)amine.

Examples of $R^1$ and $R^2$ include methyl, ethyl, propyl, n-butyl, t-butyl, octyl, hexadecyl, tridecafluoro-1-octanol, and benzyl.

Examples of $R^3$ and $R^4$ include hydrogen, methyl, and ethyl.

Other examples of suitable amines and the aspartic esters derived from them are described in U.S. Pat. Nos. 5,243,012 and 5,236,741.

The reaction of the amino acid compounds and the nitrogen reactive compounds is illustrated in the following equation, resulting in dispersant candidates useful in the present invention. Following formation of these dispersant candidates, treatment of the dispersant candidates with a hydroxide salt causes hydrolysis of one or more of the esters groups $CO_2R^1$ and $CO_2R^2$ to form the dispersants of the present invention.

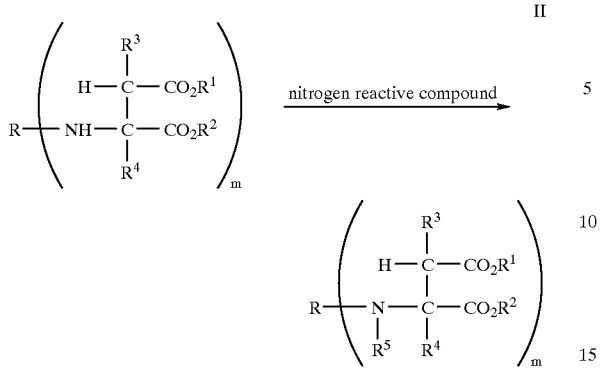

where R, $R^1$, $R^2$, $R^3$, $R^4$ and m are as previously defined in Formula I and $R^5$ is the residue of the nitrogen reactive compound and identified in the embodiments of the invention below.

Useful nitrogen reactive compounds in the above equation constitute a large group of compounds chosen for the ability to create a region of hydrophobicity. As stated above, nonlimiting examples of these "nitrogen reactive compounds" include acylating reagents (such as acid halides or acid anhydrides); carbamoyl halides; sulfamoyl halides; alkylating reagents (such as alkyl halides, alkyl mesylates, alkyl tosylates, alkyl sulfates, and epoxides); isocyanates; isothiocyanates; and sulfonating reagents (such as alkyl sulfonyl halides or aryl sulfonyl halides).

"Acylating reagents" mean a nitrogen reactive compound, which when reacted with the amino acid, results in a dispersant candidate having the formula of Formula II above, where $R^5$ can be $R^6CO$ where $R^6$ can be an alkyl, aryl, or aralkyl group. Nonlimiting examples of $R^6$ include propyl, hexyl, octyl, undecyl, octadecyl, pentadecafluoroheptyl, phenylethyl, and the like.

"Carbamoyl halides" mean a nitrogen reactive compound, which when reacted with the amino acid, results in a dispersant candidate having the formula of Formula II above, where $R^5$ can be $R^7R^8NCO$ where $R^7$ or $R^8$ independently can be an alkyl, aryl, or aralkyl group. Nonlimiting examples of $R^7$ and $R^8$ include propyl, hexyl, octyl, undecyl, octadecyl, pentadecafluoroheptyl, phenylethyl, and the like.

"Sulfamoyl halides" mean a nitrogen reactive compound, which when reacted with the amino acid, results in a dispersant candidate having the formula of Formula II above, where $R^5$ can be $R^9R^{10}NSO_2$ where $R^9$ or $R^{10}$ independently can be an alkyl, aryl, or aralkyl group. Nonlimiting examples of $R^9$ and $R^{10}$ include propyl, hexyl, octyl, undecyl, octadecyl, pentadecafluoroheptyl, phenylethyl, and the like.

"Alkylating reagents" mean a nitrogen reactive compound, which when reacted with the amino acid, results in a dispersant candidate having the formula of Formula II above, where $R^5$ can be $R^{11}$, which can be an alkyl or aralkyl group. Nonlimiting examples of $R^{11}$ include propyl, hexyl, octyl, undecyl, octadecyl, pentadecafluoroheptyl, phenylethyl, and the like.

"Alkylating (epoxide) reagents" mean a nitrogen reactive compound, which when reacted with the amino acid, results in a dispersant candidate having the formula of Formula II where $R^5$ can be $R^{12}CH(OH)CH_2$ wherein $R^{12}$ can be an alkyl, aryl, or aralkyl group. Nonlimiting examples of $R^{12}$ include propyl, hexyl, octyl, undecyl, octadecyl, pentadecafluoroheptyl, phenylethyl, and the like.

"Iso(thio)cyanate" mean a nitrogen reactive compound, which when reacted with the amino acid, results in a dispersant candidate having the formula of Formula II where $R^5$ can be $R^{13}NHCY$, where Y can be O or S, respectively, and wherein $R^{13}$ can be an alkyl, aryl, or aralkyl group. Nonlimiting examples of $R^{13}$ include propyl, hexyl, octyl, undecyl, octadecyl, pentadecafluoroheptyl, phenylethyl, para-toluenesulfonyl, and the like.

When an iso(thio)cyanate is the nitrogen reactive compound which is reacted with the amino acid, it should be understood by one skilled in the art that the originally formed (thio)urea product usually undergoes a cyclization reaction to form at least some of the hydantoin product as shown in the following reaction equation:

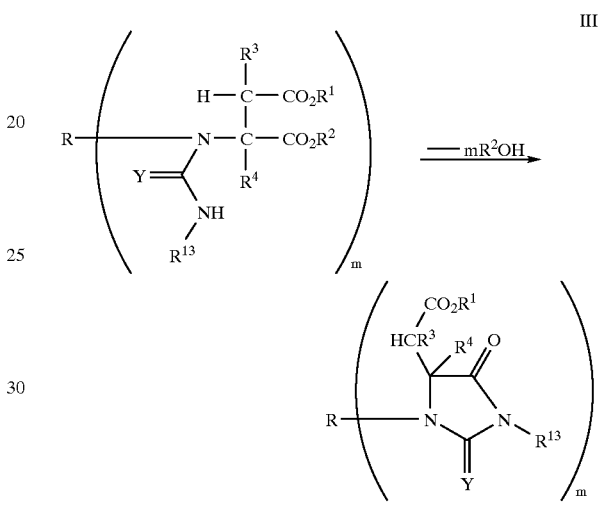

wherein Y is O for an isocyanate compound or S for an isothiocyanate compound.

When Y is oxygen, an oxygen-containing hydantoin ring is formed. For the isothiocyanate compound, the oxygen in the urea group in Formula II is replaced by sulfur, resulting in a sulfur-containing hydantoin ring. It should be understood by one skilled in the art that references in this invention to iso(thio)cyanate dispersant candidates also refer to the hydantoin cyclization byproduct. These hydantoin cyclization byproducts of Formula III also act as dispersant candidates of the present invention and undergo hydrolysis in the same manner as any of the candidates of Formula II above, as described below.

"Sulfonating reagent" means a nitrogen reactive compound, which when reacted with the amino acid, results in a dispersant candidate having the formula of Formula II where $R^5$ can be $R^{14}SO_2$ wherein $R^{14}$ can be an alkyl, aryl, or aralkyl group. Nonlimiting examples of $R^{14}$ include propyl, hexyl, octyl, undecyl, octadecyl, pentadecafluoroheptyl, phenylethyl, para-tolyl, and the like.

"Azlactone reagent" means a nitrogen reactive compound, which when reacted with the amino acid, results in a dispersant candidate having the following Formula where $R^5$ is too complex to be represented in text format:

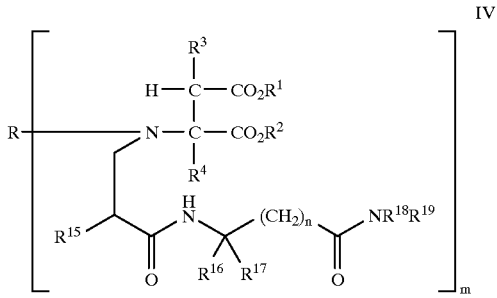

wherein $R^{15}$ is hydrogen or methyl;

$R^{16}$ and $R^{17}$ are independently hydrogen, alkyl, or aryl;

$R^{18}$ is an alkyl group (including alkyl groups with thio linkages), aryl group, oligomeric groups (e.g., polyoxyalkylene of 100 to 10,000 MW) or fluorinated alkyl (e.g., highly fluorinated alkyl groups of 20 to 765 by weight fluorine, as where at least 40% of the hydrogen atoms have been replaced by fluorine);

$R^{19}$ is H or $R^{18}$; and n is 0 or 1.

Any of the dispersant candidate compounds of Formula II can be treated with a hydroxide salt such as lithium hydroxide, sodium hydroxide, potassium hydroxide, ammonium hydroxide, or a tetrasubstituted ammonium hydroxide such as tetramethylammonium hydroxide or tetrabutylammonium hydroxide to cause hydrolysis of one or more of the ester groups $CO_2R^1$ and $CO_2R^2$. In some instances, it may be desirable to remove the groups $R^1$ and $R^2$ by other methods well known in the art, for example, hydrogenolysis of a benzyl ester or acid catalyzed removal of a tertiary butyl ester. This treatment of the dispersant candidate compounds of Formula II produces the dispersant compounds of the present invention of Formula V, which is Formula II with reaction at $R^1$ and $R^2$, wherein $R^{20}$ and $R^{21}$ are independently $R^1$ or $R^2$, respectively, or a cation such as a proton, lithium, sodium, potassium, ammonium, or tetraalkyl ammonium such as tetramethylammonium or tetrabutylammonium.

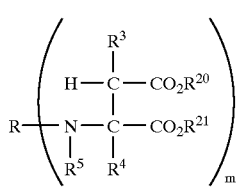

In the practice and the field of the present invention, the groups which are not directly involved in the reaction steps forming the compounds of the present invention may be substituted to meet desired physical property requirements in the final dispersants. This is not only allowable, but may be highly desirable or essential in the formation of tailored dispersants. Where individual substituents may tolerate such broad substitution, they are referred to as groups. For example, the term "alkyl group" may allow for ester linkages or ether linkages, unsubstituted alkyls, alkyls with such useful substitution as halogen, cyano, carboxylic ester, sulfonate esters or salts, and the like. Where the term "alkyl" or "alkyl moiety" is used, that term would include only unsubstituted alkyls such as methyl, ethyl, propyl, butyl, cyclohexyl, isooctyl, dodecyl, etc.

Inks: In addition to the pigments and dispersants described above, the inks will comprise primarily water as a pigment suspension agent. Such inks will typically also include further additives to provide various properties. For example, an alcoholic polyol, may be employed to control the drying rate of the ink. Suitable alcoholic polyols include, for example, polyalkylene glycols such as polyethylene glycol and polypropylene glycol; alkylene glycols whose alkylene group has 2–6 carbon atoms, such as ethylene glycol, propylene glycol, butylene glycol, triethylene glycol, 1,2,6-hexanetriol, thiodiglycol, hexylene glycol, and diethylene glycol; glycerol; and lower alkyl ethers of alcoholic polyols such as ethylene glycol monomethyl or monoethyl ether, diethylene glycol methyl or ethyl ether, and triethylene glycol monomethyl or monoethyl ether. A surfactant, useful for wetting and reducing the surface tension of the ink system, can be provided as well. In addition to the above, other ink additives commonly known in the art may also be used. These include, water-soluble organic cosolvents, humectants, biocides, fungicides, defoamers, corrosion inhibitors, viscosity modifiers, pH buffers, penetrants, sequestering agents, and the like.

Ink Processing:

Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity microshearing and cascading which breaks down agglomerations of the pigment particles. However, media mill processing systems often suffer from disadvantages including media wear product contamination. Additionally, if the flow rate in a media mill is raised beyond a certain level, the resulting grinding and dispersion becomes uneven, and much of the material leaves the system without being sufficiently processed.

Problems associated with media milling systems can be overcome, at least in part, using homogenizers and emulsifiers. These systems generally function by forcing a premix of solids and liquids to collide against a surface, or to collide against itself Unfortunately such high pressure devices are considered to be unsuitable for processing pigment dispersions due to the abrasive nature of the pigment particles and the relatively large size of pigment agglomeration structures which can plug narrow gaps through which such systems force the mixture being treated. Such clogging can be avoided, at least in part, by filtration or preprocessing to reduce the size of pigment agglomerations and to ensure sufficient dispersion of the pigment prior to use of high pressure processing.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks.

After the ink has been processed using either of the "wedge" configurations or the "impinging jet" configuration at a concentration of about 15% by weight, it is diluted with an additional amount of deionized water and diethylene glycol to produce a final ink concentration of about 4% concentration with a given diethylene glycol-to-water ratio.

In the dilution step, the dispersion is mixed using a shear mixer (available, for example, from Silverson Machines Inc., East Longmeadow, Mass.) at moderate speed while water and diethylene glycol are sequentially added. The addition of diethylene glycol is carried out slowly to prevent flocculation of the dispersion.

Following the dilution step, the ink is filtered using, for example, a 5 micron Whatman Polycap 36 HD cartridge type filter (available from Arbor Technology, Ann Arbor, Mich.). A pump, such as a Masterflex peristaltic pump (available from Barnant Co., Barrington, Ill.) can be used to feed the ink through the filter. A flow rate of about 120 milliliters per minute with a back pressure of about 3 psi is preferred.

EXAMPLES 1–6
Preparation of Dispersant Candidates and Dispersants

Example 1

Preparation of amide (acylating reagent) dispersant candidate and dispersant

To a stirred solution of 46 g of aspartic ester (obtained from Bayer #XP 7059) and 22.3 g of triethylamine (available from Aldrich Chemical Co. Milwaukee, Wis.) in 200 g of ethyl acetate was added dropwise a solution of 42 g of decanoyl chloride (available from Aldrich) in 40 g of ethyl acetate. After two days the mixture was filtered to remove triethylamine hydrochloride and the solution washed successively with 50 mL portions of water, 10% hydrochloric acid solution, saturated aqueous sodium bicarbonate solution, and brine. The solution was dried over magnesium sulfate, filtered, and solvent evaporated to leave an oil which was dissolved in 70 mL of ethanol and 80 mL of 5 Normal sodium hydroxide solution. After stirring overnight at room temperature, 75 mL of water were added and the solution extracted with two 100 mL portions of ethyl acetate. The aqueous solution was concentrated under reduced pressure. Percent solids were determined by heating a 2–3 g sample at 110° C. for 3 hours. Sufficient water was then added to make a 40% solution of the desired product in water.

Example 2

Preparation of alkylating reagent dispersant candidate and dispersant

A mixture of 46 g of aspartic ester (obtained from Bayer #XP 7059), 53.6 of 1-iododecane (available from Aldrich), and 25 g of potassium carbonate in 100 mL of N,N-dimethylformamide was stirred at 60° C. for three days, then poured into 500 mL of water. The oily product which separated was washed successively with 500 mL portions of water and brine, and then dissolved in 300 mL of diethyl ether. The solution was dried over magnesium sulfate, filtered, and solvent evaporated to leave an oil which was dissolved in 150 mL of ethanol, 50 mL of water, and 72 mL of 5 Normal sodium hydroxide solution. After stirring overnight at room temperature, the solution was concentrated under reduced pressure to about 100 mL, 50 mL of water were added and the solution extracted with two 50 mL portions of ethyl acetate. The aqueous solution was concentrated under reduced pressure. Percent solids were determined by heating a 2–3 g sample at 110° C. for 3 hours. Sufficient water was then added to make a 48% solution of the desired product in water.

Example 3

Preparation of sulfonating reagent dispersant candidate and dispersant

To a stirred solution of 88 g of aspartic ester (obtained from Bayer #XP 7059) and 39 g of triethylamine (available from Aldrich) in 180 g of ethyl acetate was added dropwise a solution of 81 g of 1-octanesulfonyl chloride (available from Aldrich) in 45 g of ethyl acetate. After four days the mixture was filtered to remove triethylamine hydrochloride and the solution washed successively with two 200 mL portions of water and two 150 mL portions of saturated aqueous sodium bicarbonate solution. The solution was dried over magnesium sulfate, filtered, and solvent evaporated to leave an oil which was dissolved in 250 mL of ethanol and 104 mL of 5 Normal sodium hydroxide solution. After stirring overnight at room temperature, the solution was concentrated under reduced pressure to about 150 mL and extracted with three 250 mL portions of toluene. The aqueous solution was concentrated under reduced pressure. Percent solids were determined by heating a 2–3 g sample at 110° C. for 4 hours. Sufficient water was then added to make a 49% solution of the desired product in water.

Example 4

Preparation of hydantoin isocyanate dispersant candidate

To a stirred solution of 111 g of aspartic ester (obtained from Bayer #XP 7059) in 200 g of ethyl acetate were added dropwise 75 g of octyl isocyanate (available from Aldrich). After four days the solvent was evaporated to leave the product which was shown by NMR spectroscopy to be a mixture of the urea addition product and the hydantoin cyclization product (ratio=~1:2).

Example 5

Preparation of hydantoin iso(thio)cyanate reagent dispersant candidate and dispersant To a stirred solution of 99 g of aspartic ester (obtained from Bayer #XP 7059) in 225 g of ethyl acetate were added dropwise 85 g of p-toluenesulfonyl isocyanate (available from Aldrich). After two days the solvent was evaporated to leave the product which was shown by NMR spectroscopy to be a mixture of the urea addition product and the hydantoin cyclization product (ratio=~3:1). This material was dissolved in 200 mL of ethanol and 86 mL of 5 Normal sodium hydroxide solution. After stirring for two days at room temperature, the solution was concentrated under reduced pressure to about 150 mL and extracted with 150 mL of toluene. The aqueous solution was concentrated under reduced pressure. Percent solids were determined by heating a 2–3 g sample at 110° C. for 4 hours. Sufficient water was then added to make a 75% solution of the desired product in water.

Example 6

Preparation of Azlactone Dispersant Candidate and Dispersant

An 8 oz. glass jar was charged with 25.3 g of Bayer aspartic ester #XP 7059 and 15.3 g of vinyldimethyl azlactone (available from SNPE, Princeton, N.J.). The jar was sealed and placed in an oven at 50° C. for 24 hours, then removed and left at room temperature for 10 days. Then 10 g of 2-(methylthio)ethylamine (available from Lancaster Synthesis Inc., Windham, N.H.) was added to cause an exothermic reaction. The reaction mixture was left at room temperature overnight, then dissolved in 75 mL of ethanol and 44 mL of 5 Normal sodium hydroxide solution. After standing overnight at room temperature, the solution was extracted with two 100 mL portions of toluene. The aqueous solution was concentrated under reduced pressure. Percent solids were determined by heating a 2–3 g sample at 110° C.

for 3 hours. Sufficient water was then added to make a 50% solution of the desired product in water.

Examples 7–19

In each of these examples, an ink concentrate identified in Table 1 was placed into an aqueous diethylene glycol (DEG) suspension medium. The ratio of pigment to the DEG/H$_2$O was varied for each example identified in Table 1.

The ink concentrate for each example was suspended in the mixture of DEG/water in a weight/weight ratio shown in Table 1. Approximately 12–15 grams of Triton X-100 surfactant was added, followed by 50 grams of a 15% emulsion of dispersant. The dispersant for each example is also identified in Table 1.

The mixture was thoroughly sheared in a shear grinder (Hill mixer) to obtain a 15% concentrate. The Hill mixer is a high speed impingement homogenizer-mixer which consists of a spiral propeller with a grapefruit style head for greater suction through the head from the propeller. The mixer motor is rated at 1HP with a capability of 10,000 rpm. Propeller speeds up to 4000 rpm can be run in forward or reverse and both modes were used for grinding.

The concentrate was processed using the impinging jet process (described above), filtered as described above, and tested for sediment, clarity of supernatant, and dispersion stability, all as also show in Table 1.

TABLE 1

| Example | Dispersant Example | Pigment | DEG/H$_2$O Solvent Ratio | Pigment/Solvent Ratio (W/W) | Sediment | Clear Supernatant | Dispersion Stability @ 2 Weeks |
|---|---|---|---|---|---|---|---|
| 7  | 1 | Cyan[1]    | 20/80 | 3.5/1      | No         | No  | Stable |
| 8  | 1 | Magenta[2] | 30/70 | 3/2        | No         | No  | Stable |
| 9  | 1 | Cyan       | 20/80 | 3.5/1      | No         | No  | Stable |
| 10 | 2 | Cyan       | 20/80 | 3.5/1      | No         | No  | Stable |
| 11 | 2 | Magenta    | 30/70 | 3/2        | No         | Yes | Slightly Coagulated |
| 12 | 2 | Yellow[3]  | 30/70 | Coagulated | Yes        | Yes | Coagulated |
| 13 | 5 | Cyan       | 20/80 | 3.5/1      | No         | No  | Stable |
| 14 | 5 | Magenta    | 30/70 | 3/2        | No         | No  | Stable |
| 15 | 5 | Yellow     | 30/70 | Coagulated | Yes        | Yes | Coagulated |
| 16 | 6 | Cyan       | 20/80 | 3.5/1      | No         | No  | Stable |
| 17 | 6 | Magenta    | 30/70 | 3/2        | No         | No  | Stable |
| 18 | 3 | Cyan       | 20/80 | 3.5/1      | No         | No  | Stable |
| 19 | 3 | Magenta    | 30/70 | 3/2        | No         | No  | Stable |

[1]Cyan Pigment commercially available as Sunfast Blue 15:3 Presscake (50% solids) (obtained from Sun Chemical Corp.).
[2]Magenta Pigment commercially available as Sunfast Magenta Presscake 122 (50% solids) (obtained from Sun Chemical Corp.).
[3]Yellow Pigment commercially available as Fanchon Fast Yellow Y-5688 (nickel complex) from Miles Labs.

Equivalents

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A water-based pigmented ink which comprises a suspension of:
   a) pigment particles, and
   b) a dispersant of a formula of

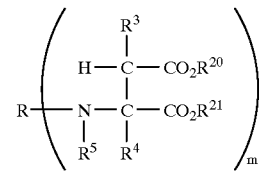

wherein R is an alkyl, aryl, or aralkyl group obtained by the removal of primary amino groups from alkyl, aryl, or aralkyl amines;

m=1 to 6;

R$^3$ and R$^4$ are hydrogen or lower alkyl;

R$^5$ is the residue of the nitrogen reactive compound selected from the group consisting of acylating reagents, carbamoyl halides, sulfamoyl halides, alkylating reagents, alkylating (epoxide) reagents, iso(thio) cyanates, sulfonating reagents;

wherein R$^{20}$ and R$^{21}$ are independently, alkyl, aryl, or aralkyl groups, or a cation selected from the group consisting of a proton, lithium, sodium, potassium, ammonium, or tetraalkyl ammonium.

2. The water-based pigmented ink of claim 1, wherein the dispersant is a reaction product of an amino acid compound and a nitrogen reactive compound, according to an equation of

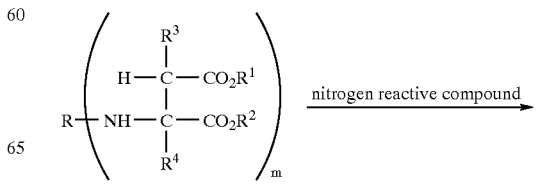

-continued

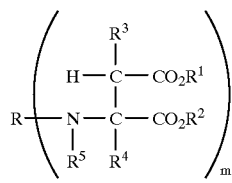

wherein $R^1$ and $R^2$ are independently, alkyl, aryl, or aralkyl groups.

3. The water-based pigmented ink of claim 2, wherein the amino acid compound comprises an aspartic ester.

4. The water-based pigmented ink of claim 3, wherein the aspartic ester comprises a mono- or bis- aspartic ester.

5. The water-based pigmented ink of claim 1, wherein $R^5$ is selected from the group consisting of
$R^6CO$, wherein $R^6$ is an alkyl, aryl, or aralkyl group;
$R^7R^8NCO$, wherein $R^7$ or $R^8$ independently is an alkyl, aryl, or aralkyl group;
$R^9R^{10}NSO_2$ where $R^9$ or $R^{10}$ independently is an alkyl, aryl, or aralkyl group;
$R^{11}$, which is an alkyl or aralkyl group;
$R^{12}CH(OH)CH_2$ wherein $R^{12}$ is an alkyl, aryl, or aralkyl group;
$R^{13}NHCY$, wherein Y is O or S, respectively, and wherein $R^{13}$ can be an alkyl, aryl, or aralkyl group; and
$R^{14}SO_2$, wherein $R^{14}$ is an alkyl, aryl, or aralkyl group.

6. The water-based pigmented ink of claim 5, wherein, when $R^5$ is $R^{13}NHCY$, and when Y is S or O, a cyclization reaction according to a equation of

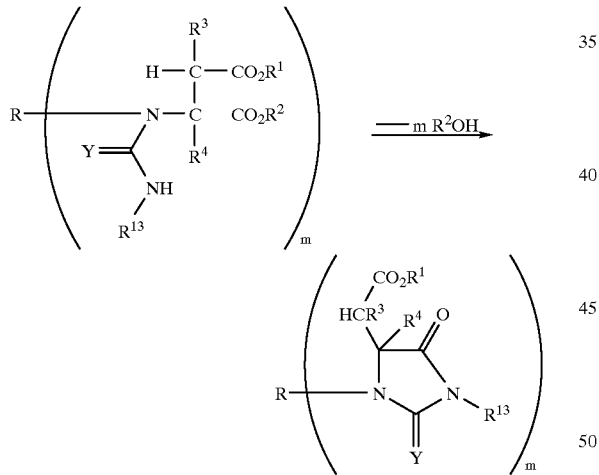

results in a hydantoin-based dispertant.

7. The water-based pigmented ink of claim 2, wherein the reaction product of the equation is reacted with a hydroxide selected from the group consisting of lithium hydroxide, sodium hydroxide, potassium hydroxide, ammonium hydroxide, a tetrasubstituted ammonium hydroxide, and combinations thereof,
in order to cause hydrolysis of one or more of the ester groups $CO_2R^1$ and $CO_2R^2$.

8. The water-based pigmented ink of claim 1, which further comprises a surfactant.

9. The water-based pigmented ink of claim 1, which further comprises an alcoholic polyol.

10. The water-based pigmented ink of claim 9, wherein the alcoholic polyol comprises an ethylene glycol.

11. The water-based pigmented ink of claim 1, wherein the pigment is selected from the group consisting of black, yellow, magenta, and cyan pigments.

12. The water-based pigmented ink of claim 11, wherein the black pigment comprises a carbon black pigment.

13. The water-based pigmented ink of claim 11, wherein the yellow pigment comprises a nickel azo yellow pigment.

14. The water-based pigmented ink of claim 11, wherein the magenta pigment comprises a quinacridone magenta pigment.

15. The water-based pigmented ink of claim 11, wherein the cyan pigment comprises a copper phthalocyanine pigment.

16. The water-based pigmented ink of claim 1 wherein the dispersant interacts hydrophobically with the pigment particles and interacts hydrophilically with water.

17. A method of using a dispersant of a formula of

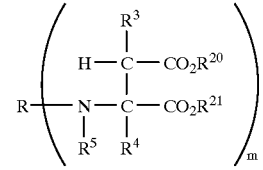

wherein R is an alkyl, aryl, or aralkyl group obtained by the removal of primary amino groups from alkyl, aryl, or aralkyl amines;
m=1 to 6;
$R^3$ and $R^4$ are hydrogen or lower alkyl;
$R^5$ is the residue of the nitrogen reactive compound selected from the group consisting of acylating reagents, carbamoyl halides, sulfamoyl halides, alkylating reagents, alkylating (epoxide) reagents, iso(thio) cyanates, sulfonating reagents;
wherein $R^{20}$ and $R^{21}$ are independently, alkyl, aryl, or aralkyl groups, or a cation selected from the group consisting of a proton, lithium, sodium, potassium, ammonium, or tetraalkyl ammonium, comprising the steps of:
(a) mixing the dispersant with an ink; and
(b) depositing the ink on a substrate.

18. A method of preparing a water-based pigmented ink, comprising the step of mixing pigment particles with dispersant of a formula of

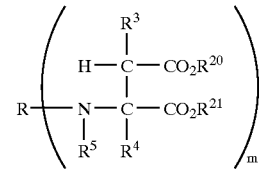

wherein R is an alkyl, aryl, or aralkyl group obtained by the removal of primary amino groups from alkyl, aryl, or aralkyl amines;
m=1 to 6;
$R^3$ and $R^4$ are hydrogen or lower alkyl;
$R^5$ is the residue of the nitrogen reactive compound selected from the group consisting of acylating reagents, carbamoyl halides, sulfamoyl halides, alkylating reagents, alkylating (epoxide) reagents, iso(thio) cyanates, sulfonating reagents;
wherein $R^{20}$ and $R^{21}$ are independently, alkyl, aryl, or aralkyl groups, or a cation selected from the group consisting of a proton, lithium, sodium, potassium, ammonium, or tetraalkyl ammonium;

wherein the dispersant interacts hydrophobically with the pigment particles and interacts hydrophilically with water.

19. A method of using a water-based pigmented ink, comprising the step of depositing the ink on a substrate, wherein in the ink comprises pigment particles and dispersant of a formula of

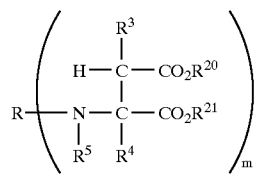

wherein R is an alkyl, aryl, or aralkyl group obtained by the removal of primary amino groups from alkyl, aryl, or aralkyl amines;

m=1 to 6;

$R^3$ and $R^4$ are hydrogen or lower alkyl;

$R^5$ is the residue of the nitrogen reactive compound selected from the group consisting of acylating reagents, carbamoyl halides, sulfamoyl halides, alkylating reagents, alkylating (epoxide) reagents, iso(thio) cyanates, sulfonating reagents;

wherein $R^{20}$ and $R^{21}$ are independently, alkyl, aryl, or aralkyl groups, or a cation selected from the group consisting of a proton, lithium, sodium, potassium, ammonium, or tetraalkyl ammonium.

20. An ink comprising:

pigment particles and dispersant of a formula of

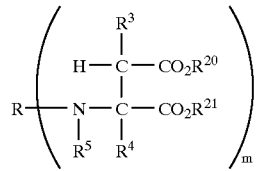

wherein R is an alkyl, aryl, or aralkyl group obtained by the removal of primary amino groups from alkyl aryl, or aralkyl amines;

m=1 to 6;

$R^3$ and $R^4$ are hydrogen or lower alkyl;

$R^5$ is the residue of the nitrogen reactive compound selected from the group consisting of acylating reagents, carbamoyl halides, sulfamoyl halides, alkylating reagents, alkylating (epoxide) reagents, iso(thio) cyanates, sulfonating reagents;

wherein $R^{20}$ and $R^{21}$ are independently, alkyl, aryl, or aralkyl groups, or a cation selected from the group consisting of a proton, lithium, sodium, potassium, ammonium, or tetraalkyl ammonium.

21. A combination of pigment and dispersant in hydrophobic interaction, comprising:

pigment particles and dispersant hydrophobically interacting with pigment particles, wherein the dispersant comprises a compound of a formula of

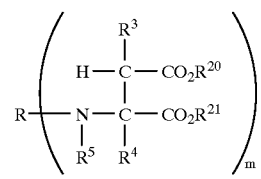

wherein R is an alkyl, aryl, or aralkyl group obtained by the removal of primary amino groups from alkyl, aryl, or aralkyl amines;

m=1 to 6;

$R^3$ and $R^4$ are hydrogen or lower alkyl;

$R^5$ is the residue of the nitrogen reactive compound selected from the group consisting of acylating reagents, carbamoyl halides, sulfamoyl halides, alkylating reagents, alkylating (epoxide) reagants, iso(thio) cyanates, sulfonating reagents;

wherein $R^{20}$ and $R^{21}$ are independently, alkyl, aryl, or aralkyl groups, or a cation selected from the group consisting of a proton, lithium, sodium, potassium, ammonium, or tetraalkyl ammonium.

22. The combination of claim 21, wherein pigment particles are selected from the group consisting of black, yellow, magenta, and cyan pigments.

* * * * *

UNITED STATES PATENT AND TRADEMARK OFFICE
CERTIFICATE OF CORRECTION

PATENT NO. : 5,951,749
DATED : September 14, 1999
INVENTOR(S) : Larry R. Krepski et al.

It is certified that error appears in the above-identified patent and that said Letters Patent is hereby corrected as shown below:

Title page,
ABSTRACT, in the penultimate line, "resultinginks" should read -- resulting inks --.

Column 5,
Line 46, "N-methyl-(1)-alanine" should read -- N-methyl-(*l*)-alanine --.
Line 46, "(±)" should read -- (+/-) --.
Line 58, "(±)" should read -- (+/-) --.

Signed and Sealed this

Thirtieth Day of April, 2002

Attest:

JAMES E. ROGAN
*Attesting Officer*   *Director of the United States Patent and Trademark Office*